United States Patent [19]

Sbarra

[11] 3,896,924
[45] July 29, 1975

[54] METHOD AND APPARATUS FOR REMOVING FIBROUS PARTICLES FROM A CONVEYOR BELT

[76] Inventor: Michael A. Sbarra, 95 Narrangansett Ave., Ossining, N.Y.

[22] Filed: Sept. 14, 1973

[21] Appl. No.: 397,286

[52] U.S. Cl.................................. 198/230; 15/77
[51] Int. Cl............................................ B65g 45/00
[58] Field of Search ................ 198/230; 15/77, 102

[56] References Cited
UNITED STATES PATENTS

| | | | |
|---|---|---|---|
| 583,871 | 6/1897 | Travis et al. | 15/77 UX |
| 1,791,728 | 2/1931 | Linfesty | 198/230 |
| 2,372,599 | 3/1945 | Nachtman | 15/77 X |
| 2,855,094 | 10/1958 | Zebarth | 198/230 |
| 3,237,231 | 3/1966 | Zink | 15/102 |

Primary Examiner—James B. Marbert
Assistant Examiner—Douglas D. Watts
Attorney, Agent, or Firm—Eugene Lieberstein, Esq.

[57] ABSTRACT

Fibrous particles are removed from a moving resilient conveyor belt surface by subjecting the surface to a wet scrubbing in combination with the application of a foam within which the particles suspend themselves permitting removal by the clearance of such foam.

9 Claims, 4 Drawing Figures

PATENTED JUL 29 1975　　SHEET　2　　3,896,924

3,896,924

METHOD AND APPARATUS FOR REMOVING FIBROUS PARTICLES FROM A CONVEYOR BELT

FIELD OF THE INVENTION

This invention relates generally to a method and apparatus for cleaning the surface of a conveyor belt and more particularly to a method and apparatus for removing foreign particles such as fibrous lint deposits from the surface of an endless conveyor belt moving at operational speeds.

BACKGROUND OF THE INVENTION

It is quite common in the handling of cloth and other fibrous materials to locate the material upon a moving endless conveyor for purposes of performing certain automated operations as well as for transporting the material to additional locations for further processing. For example, in the application of printing a design pattern upon a woven fabric, prior to its conversion into a garment, all or certain of the printing operations take place upon the cloth while it is held in alignment upon a moving conveyor belt. The surface of the conveyor belt may be composed of resilient materials such as rubber, neoprene, synthetic resins or fabric materials. The cloth is held in proper registration upon the belt surface by means of an adhesive material, of conventional constituency, applied to the printing surface of the belt. After printing, the cloth travels downstream and is removed from the conveyor. A certain amount of lint, a residue of printing ink and other contaminant matter remain lodged in the interstices of the belt surface and if not removed will impair or disrupt further printing. Therefore, it is essential to the operation that such lint and other contaminant residue be removed and preferably by treating the return section of the belt surface so as to free such surface of foreign contamination while undergoing a simultaneous printing operation upon the forward section of the conveyor belt.

Heretofore, all techniques for removing foreign particles imbedded in the surface of a moving conveyor belt involved some form of surface scraping usually using a complex doctor blade assembly along or in combination with brushes. The scraping operation was, in some instances, further accompanied by a cleaning operation involving directing water or a cleaning fluid at the belt surface and/or at the blade-belt surface interface. The orientation of the doctor blades was critical so that adequate scraping would be accomplished without damaging the surface of the belt. The scraping equipment required routine and frequent maintenance to remove deposits of lint and other particles which accumulated at the doctor blades. Notwithstanding all of the care given to such equipment, the scraping operation invariably left score marks, which affected printing performance and accelerated the deterioration of the conveyor belt surface, shortening its useful life.

SUMMARY OF THE INVENTION

It has been discovered in accordance with the present invention that a conveyor belt surface of resilient material may be maintained substantially free from deposits of lint and other foreign contaminants while moving at operation speeds by a process comprising the steps of:

a. juxtaposing a body of liquid beneath said belt surface at a location along the path traversed by said moving belt;

b. generating a foam at the surface of said body of liquid;

c. scrubbing the surface of said belt above said body of liquid;

d. applying said foam to said belt surface substantially concomitantly with step (c); and e. removing said deposit of foam from said belt surface.

The present invention also covers apparatus for dislodging and removing fibrous particles from a resilient conveyor belt surface while the belt is moving comprising: a basin having an open top located beneath the surface of the belt along the path traversed by said belt, means for introducing water and a foaming agent into said basin for forming a wash solution, said water being continuously pumped into said basin to cause an overflow condition; at least two scrubbing brushes mounted in said basin transverse to the direction of belt travel with each brush being in contact with said wash solution and extending above the open top of said basin in contact with said belt surface; means for rotating said brushes in a direction to oppose movement of the belt and at a speed sufficient to generate a substantial foam at the open top of the basin and for rotatably scrubbing the surface of the belt passing over the basin while simultaneously applying the generated foam to said belt surface with each brush having a geometry in a herringbone configuration which is so arranged with respect to one another that the overflow surface water and foam is driven toward the center of the basin and over the open top from the sides thereof and means for clearing a residue of said foam from the belt surface after passing the basin location.

OBJECTS OF THE INVENTION

Accordingly, it is the principle object of the present invention to provide a method and apparatus for removing foreign particles from a moving conveyor belt surface.

It is another object of the present invention to provide a method and apparatus for removing foreign particles from a conveyor belt and in which the removed particles are collected and discharged from, a wash solution in turn is continuously recycled forming a closed loop system.

Other objects and advantages of the present invention will become apparent from the following detailed description when taken in connection with the accompanying drawings in which.

DETAILED DESCRIPTION OF THE INVENTION

The apparatus of the present invention is intended for installation upon any conventional conveyor belt machine of, preferably, the endless loop variety. As such, the apparatus is schematically shown with only such essential appended structural fixturing as would be appropriate for interconnection with any conventional machine.

Figure 1:
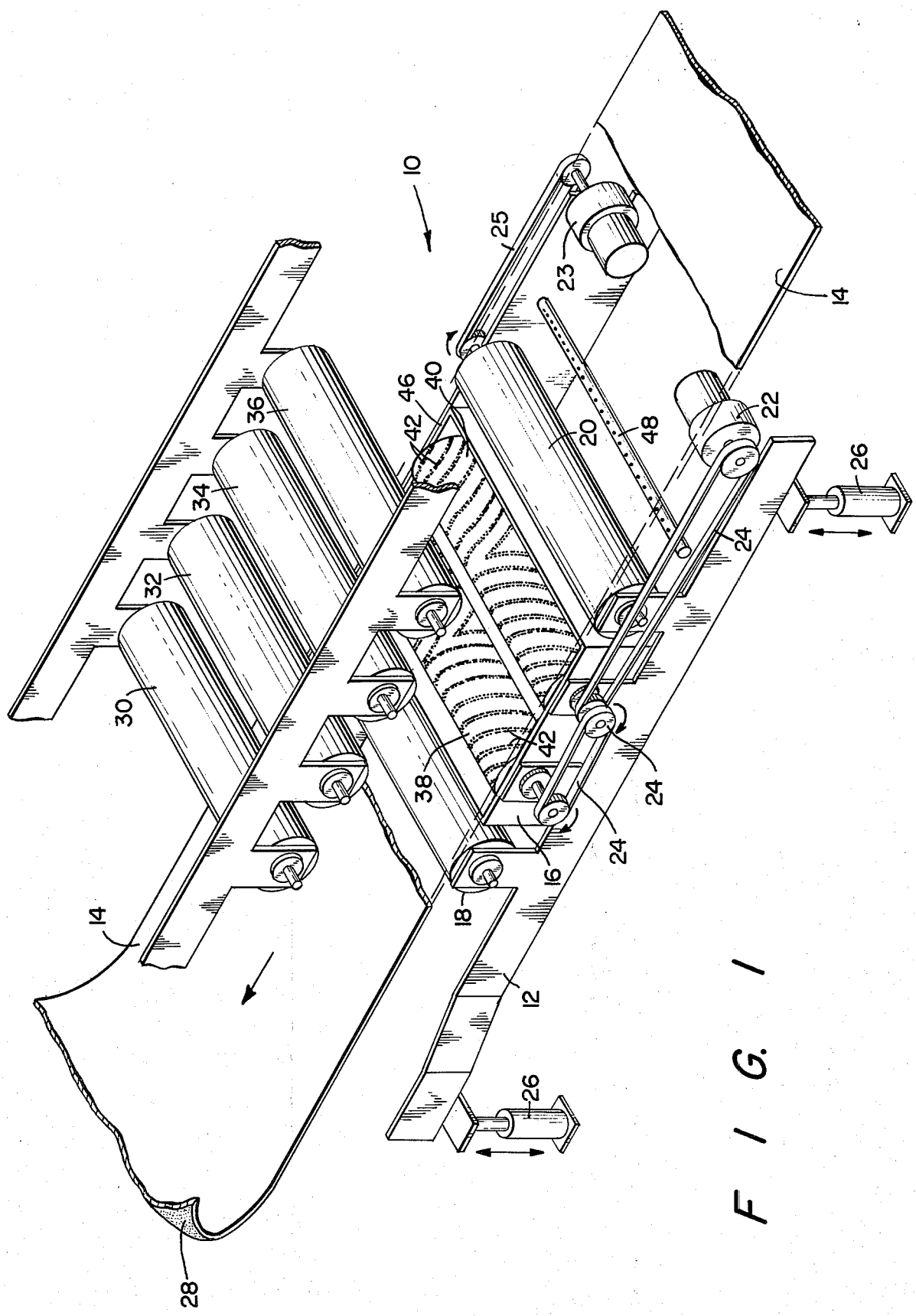
FIG. 1 is a showing in perspective of the essential apparatus of the present invention in its non-operative mode.

Referring now in particular to FIG. 1, in which is shown the conveyor belt cleaning assembly 10 of the present invention, including, in general, a framework 12 which is located beneath the conveyor belt 14 to be treated and in substantial parallel alignment with the conveyor belt path of travel. The framework 12 supports a wash basin 16, a blocking roller 18, a slurrying roller 20, motors 22 and 23 and associated gear drive trains 24 and 25 respectively. The framework 12 is mounted upon a plurality of linear reciprocating piston-cylinder devices 26 located at each of the four corners of the framework 12. The devices 26 may be actuated hydraulically or pneumatically and in concert, or independent of one another, to raise the framework 12, preferably in a plane parallel to the plane of the conveyor belt 14, until the wash basin 16 and rollers 18 and 20 respectively abut, and in a uniform manner, the underbottom surface 28 of the moving belt 14. An alternative arrangement is to use one end of the framework 12 as a pivot or fulcrum for the structure and to raise the opposite end of the framework 12 about the pivoted end by means of only two of such reciprocating devices 26 located at such opposite end. The particular arrangement selected would depend upon the design of the conveyor machine employed and the pitch or slope of the conveyor belt 14 as it passes over the framework 12, of the assembly 10. In this regard, it should be understood that the mechanism employed for lifting the framework 12 and the manner in which the lifting is accomplished, is not critical to the present invention. It does, however, represent an auxiliary feature of the assembly 10 in that it provides the assembly 10 with both an operating mode and a non-operating mode. The assembly 10 is in the non-operating mode when the framework 12 is lowered into a position as illustrated in FIG. 1 with the endless conveyor belt 14 passing over the framework 12 untreated. The assembly 10 is then placed in the operating mode by actuating the reciprocating devices 26 which raise the framework 12 until the wash basin 16 and rollers 18 and 20 respectively lie in an appropriate position, as will be elaborated upon hereinafter, contiguous with the underbottom surface 28 of belt 14. The underbottom surface 28 becomes the operational top surface of the belt 14 upon advancement to the opposite side of the endless loop. The phrase "underbottom surface 28" is intended to indicate only the particular surface of the belt 14 under treatment in accordance with the preferred embodiment of the present invention illustrated in FIG. 1. The invention herein is not to be construed as limited to treating any particular section of the belt or any given surface thereof, although, as a practical matter, it is preferred to treat the return side of the belt 14.

A number of idler rollers 30, 32, 34 and 36 respectively, provide a back-up for each of the rollers supported by framework 12 and lie in a common plane above and substantly parallel to, the moving belt 14 with their longitudinal axes transverse to the direction of belt travel. The purpose of the idler rollers is to assist in entraining the belt 14 when the assembly 10 is in its operating mode. Although the idler rollers 30, 32, 34 and 36 are shown as affixed in a predetermined stationary position relative to the belt 14 and the framework 12, it is understood that the idler rollers may be, if so desired, vertically adjustable. Although not shown in FIG. 1, it is preferred to mount the idler rollers upon the steel beams of a conventional conveyor machine structure and at a location above the section of the conveyor belt 14 to be treated. When the assembly 10 is in its operating mode, each of the idler rollers 30, 32, 34 and 36 respectively adjoin corresponding rollers supported by framework 12 with the conveyor belt 14 passing between each set of rollers. All of the idler rollers 30, 32, 34 and 36, respectively, and the blocking and slurrying roller 18 and 26 respectively, may each be constructed in a similar fashion, such as, for example, using a steel cylindrical conduit with a covering material. Although the wash basin 16 also includes two rollers 38 and 40 which are substantially parallel with one another and which are aligned with their counterpart idler rollers 32 and 34 respectively, the rollers 38 and 40 require, as will be explained hereafter in more elaborate detail, an exterior surface having radial projections 42 about their periphery and which form upon each roller a pattern of predetermined geometry. The radial projections 42 from each of the rollers 38 and 40 may consist of bristles of any conventional material, preferably resilient, such as natural or synthetic fibers as might typically be incorporated in a brush. The bristles form a herringbone-like pattern emanating from the center of each roller respectively and consisting geometrically of two sets of substantially parallel strips of bristles, with each strip of any one set intersecting a corresponding strip of the other set at a plane located in the center of the roller and transverse to its longitudinal axis with the included angle between intersecting strips being about ninety degress.

Figure 2:
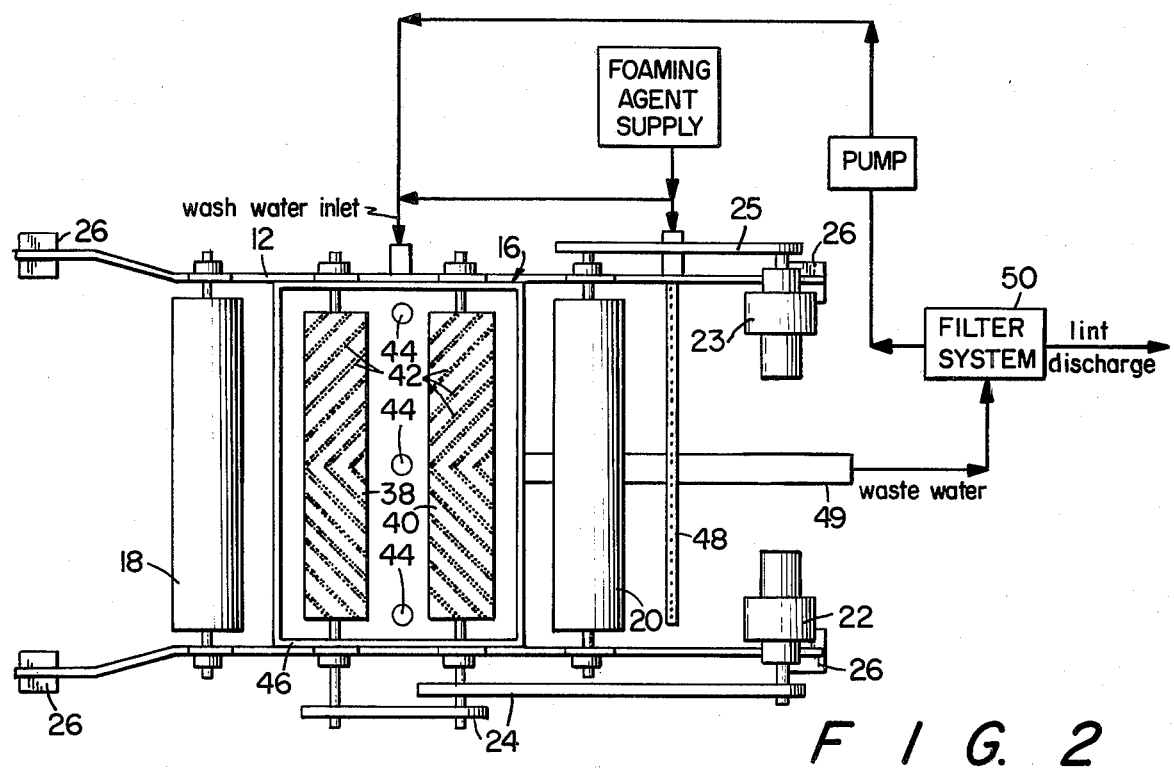
FIG. 2 is a plan view of the assembly of the present invention taken along the lines 2—2 of FIG. 1 coupled with a schematic showing of some additional components for forming a closed loop wash recycling system in accordance with the principles of the present invention.
Figure 3:
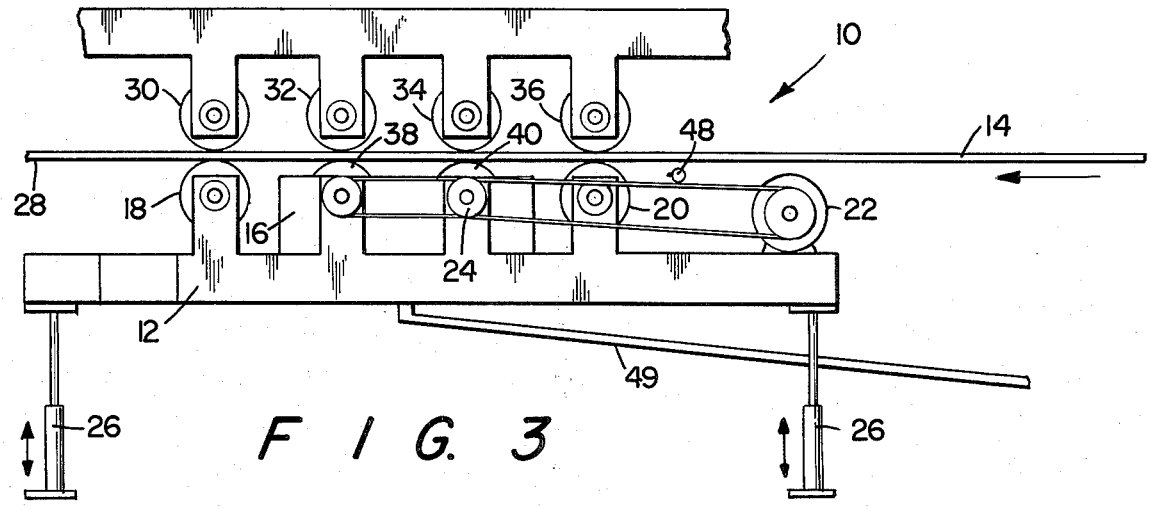
FIG. 3 is a front view of the assembly of FIG. 1 in its operating mode.
Figure 4:
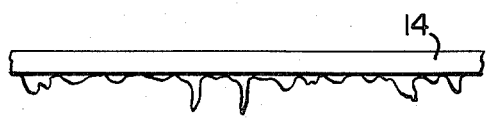
FIG. 4 is a pictorial showing of the surface of the conveyor belt under treatment in accordance with the principles of the present invention and before removal of the applied foam.

Referring now to FIGS. 2–4 inclusive wherein the wash basin 16 is shown located intermediate the blocking roller 18 and the slurrying roller 20 with each of such rollers in substantial parallel alignment with respect to each other and with the longitudinal axis of each roller substantially transverse to the direction of belt travel. The wash basin 16 is a reservoir for a wash solution which passes into the interior of the basin 16 from apertures 44 located at the bottom thereof. The material of construction of the basin 16 is not significant; even wood has been found to be a satisfactory material. Although the phrase "wash solution" is being used herein, it is not intended to attribute any particular characteristic to such solution. In fact the only characteristic the wash solution must possess to fulfill the requirements of the present invention is the capability, by itself or in solution with an agent, to produce a foam at its surface once agitated. Hence, pure water may be employed as the base for the wash solution and is preferred as such. A foaming agent may be directly introduced into the wash basin 16 or indirectly introduced therein as will be explained hereafter. The term "foam" as is used hereinafter is defined as an aggregation of bubbles.

The wash basin 16 includes, as mentioned hereinbefore, two rollers 38 and 40 respectively which are mounted in a parallel relationship with each other and at substantially the same height above the framework 12 as is shown in FIG. 3. It is preferred that the blocking roller 18 and slurrying roller 20 be held at the same vertical level as roller 38 and 40 respectively. In addition, rollers 38 and 40 should have their circumference extend somewhat above the lip 46 of basin 16.

Rollers 38 and 40 respectively are journaled at their ends to the gear drive train 24 for rotation about their longitudinal axes in a direction to oppose travel of the conveyor belt 14. The gear drive train 24 is coupled back to the motor 22 which may be of any conventional type and size provided it can produce sufficient output torque to cause a rotation of the rollers 38 and 40 at a relatively high rotational speed while the assembly 10 is in the operating mode and with the conveyor belt 14 traveling at normal operating speeds. The motor 23 is used to rotatably drive the slurrying roller 20 which should preferably be rotated in a direction to oppose belt travel. Although considered impractical motor 22 could be used to rotate all of the rollers 38, 40 and 20 respectively.

A spray bar 48 is located adjacent the slurrying roller 20 for dispensing the foaming agent onto the slurrying roller 20 or upon the surface of the belt 14 at a location immediately before contact is made with the roller 20. The slurrying roller 20 intermixes the foaming agent with the adhesive and ink residue on the belt surface before passing over the wash basin 16. The foaming agent is channeled into the spray bar from a source of supply (not shown). Any conventional agent or detergent may be used as the foaming agent.

The wash solution, preferably of ordinary tap water and agent, is passed out over the lip 46 of the wash basin 16 into a trough 48 from whence it passes through a conventional filter 50 for separating out the lint particles. The cleaned effluent of wash water and agent is then pumped back into the wash basin 16 for reuse thereby completing a closed loop wash cycle.

OPERATION

Turning now to the preferred method of operation of the apparatus and referring to all the FIGS. 1-4 inclusive; the assembly 10 is rendered operational by activating the lifting mechanisms 26 until the framework 12 and the basin 16 is raised into a position juxtaposed beneath the moving belt 14 with rollers 20, 38 and 40 making rotational contact therewith.

The slurrying roller 20 as indicated hereinabove and as its name implies produces at the belt surface 28 a slurry of ink, lint and adhesive in combination with the foaming agent just prior to passing over the wash basin 16. Although introducing the foaming agent as part of the slurry is preferred, the result is substantially the same when the foaming agent is introduced directly into the basin 16 or in the wash water supply line.

The belt 14 than passes over the basin 16 where contact is first established with the whirling roller 40. The function of the roller 40 is to scrub the belt surface 28 thereby loosening the attachment of the lint and other foreign particles trapped in the belt, as well as to agitate the wash solution intermixing it with the slurry to form a foam at the liquid wash surface which is applied to the belt surface. This same condition is achieved using the other roller brush 38. As the belt leaves the basin 16, the underbotton surface 28 is left heavily saturated with foam as illustrated in FIG. 4. It is postulated that the foam provides a greater attractive force to the loosened lint particles than does the belt surface. The foam bubbles have been observed to contain lint particles in suspension. Once trapped within the foam the lint particles remain in suspension and are readily removed from the belt surface by merely removing the foam. One simple way of accomplishing this is through the use of a blocking roller 18 which in conjunction with roller 30 provides a squeegee action to clear the foam from the belt 14.

A number of factors have been found to be important in affecting performance, namely: rotational roller speed and direction, bristle geometry, and adhesive constituency. With the exception of the latter parameter, which is a variable determined primarily by the operation, the remaining factors are controllable and play particularly significant roles. For example, the scrubbing action at the belt surface is far more effective when the rollers 38 and 40 respectively are rotated in a direction to oppose belt travel. Moreover, the speed of rotation must be high enough to cause sufficient agitation of the wash solution and should have a high relative speed to that of the moving belt 14. The actual number of rollers in the wash basin 16 is less significant although at least two is preferred. The herring-bone like pattern formed by the bristles on rollers 38 and 40 is an important feature for avoiding the collection of dislodged lint at the bristles of the rollers. The loosened lint which washes off the surface of the belt while the belt passes over the basin 16 is routed by the inward directed bristle pattern toward the center of the basin 16 and cataracts from both ends over the basin lip 46 with the overflow wash water and surface foam. This is a fundamental advantage of the present process over conventional processes in that removed lint is continuously washed away from the cleaning area. As stated earlier, the discharged effluent of lint, wash water and foam may be filtered and recycled back under pressure into the basin 16 as the wash solution to form a closed loop wash cycle. Thus, there is no collection of lint at the wash basin 16.

Although the process and apparatus of the present invention has been taught and disclosed in conjunction with the preferred embodiment, it is to be appreciated that the invention is susceptible to modification, variation and change without departing from the scope of the invention.

What is claimed is:

1. A method of dislodging and removing fibrous particles from a resilient conveyor belt surface while the belt is moving comprising the steps of:
   a. juxtaposing a body of liquid comprising substantially water beneath said belt surface at a location along the path traversed by said moving belt;
   b. introducing a foam agent into said liquid body to form a wash solution;
   c. generating a foam at the surface of said wash solution;
   d. scrubbing the surface of said belt as it passes over said wash solution;
   e. applying said foam to said belt surface substantially concomitantly with step (d);
   f. removing a residue of said foam from said belt surface after it leaves said location.

2. A method as defined in 1 wherein said foam is generated by agitating said solution.

3. A method as defined in claim 2 wherein the step of agitating occurs substantially simultaneously with steps (d) and (e).

4. A method as defined in claim 3 further comprising the steps of (g) containing said body of liquid within a basin and (h) continuously pumping said solution into said basin to cause an overflow condition.

5. A method as defined in claim 4 further comprising the steps of (i) collecting said overflow of solution; (j) filtering the foreign particles therefrom and (k) recycling the filtered solution back into said basin.

6. Apparatus for dislodging and removing fibrous particles from a resilient conveyor belt surface while the belt is moving comprising: a basin having an open top located beneath the surface of the belt along the path traversed by said belt, means for introducing water and a foaming agent into said basin for forming a wash solution, said water being continuously pumped into said basin to cause an overflow condition; at least two scrubbing brushes mounted in said basin transverse to the direction of belt travel with each brush being in contact with said wash solution and extending above the open top of said basin in contact with said belt surface; means for rotating said brushes in a direction to oppose movement of the belt and at a speed sufficient to generate a substantial foam at the open top of the basin and for rotatably scrubbing the surface of the belt passing over the basin while simultaneously applying the generated foam to said belt surface with each brush having a geometry in a herringbone configuration which is so arranged with respect to one another that the overflow surface water and foam is driven toward the center of the basin and over the open top from the sides thereof and means for clearing a residue of said foam from the belt surface after passing the basin location.

7. Apparatus as defined in claim 6 further comprising: a trough for collecting the overflowing wash solution from said basin; filter means for removing foreign particles from the collected solution and conduit means for recycling the filtered solution back into the basin.

8. Apparatus as defined in claim 7 wherein said means for removing said residue of foam is a blocking roller lying parallel to said brushes and maintained in rotational contact with said moving belt.

9. Apparatus as defined in claim 7 further comprising a framework for supporting said basin and means for raising and lowering at least one end of said framework into an operational and non-operational mode respectively.

* * * * *